United States Patent
Benke et al.

(10) Patent No.: US 11,119,830 B2
(45) Date of Patent: Sep. 14, 2021

(54) THREAD MIGRATION AND SHARED CACHE FENCING BASED ON PROCESSOR CORE TEMPERATURE

(71) Applicant: International Business Machines Corporation, Armonk, NY (US)

(72) Inventors: Oliver Benke, Stuttgart (DE); Tobias U. Bergmann, Weinstadt (DE)

(73) Assignee: INTERNATIONAL BUSINESS MACHINES CORPORATION

( * ) Notice: Subject to any disclaimer, the term of this patent is extended or adjusted under 35 U.S.C. 154(b) by 237 days.

(21) Appl. No.: 15/844,901

(22) Filed: Dec. 18, 2017

(65) Prior Publication Data

US 2019/0188053 A1 Jun. 20, 2019

(51) Int. Cl.
| | |
|---|---|
| *G06F 9/50* | (2006.01) |
| *G06F 11/30* | (2006.01) |
| *G06F 1/20* | (2006.01) |
| *G06F 11/20* | (2006.01) |

(52) U.S. Cl.
CPC .......... *G06F 9/5094* (2013.01); *G06F 1/206* (2013.01); *G06F 11/203* (2013.01); *G06F 11/3058* (2013.01)

(58) Field of Classification Search
CPC ...... G06F 1/324; G06F 9/4856; G06F 9/4893; G06F 9/5094; G06F 11/0724; G06F 11/0796; G06F 11/3058; G06F 1/206; G06F 1/329; G06F 11/0754; G06F 11/203; G06F 11/3024; G06F 2201/81; Y02D 10/00
See application file for complete search history.

(56) References Cited

U.S. PATENT DOCUMENTS

| | | | |
|---|---|---|---|
| 7,539,819 B1* | 5/2009 | Moll ..................... | G06F 12/084 711/122 |
| 2007/0256076 A1* | 11/2007 | Thompson ............ | G06F 9/5066 718/102 |
| 2011/0161627 A1* | 6/2011 | Song ..................... | G06F 1/3203 712/30 |
| 2011/0213993 A1* | 9/2011 | Greenhalgh .......... | G06F 1/3203 713/320 |
| 2012/0324250 A1 | 12/2012 | Chakraborty et al. | |
| 2013/0246825 A1* | 9/2013 | Shannon ............. | G06F 12/0846 713/324 |

(Continued)

OTHER PUBLICATIONS

Constantinou et al., "Performance Implications of Single Thread Migration on a Chip Multi-Core" Sep. 2005, pp. 80-91.*

(Continued)

*Primary Examiner* — David J. Huisman
(74) *Attorney, Agent, or Firm* — Cantor Colburn LLP; Margaret McNamara (57) ABSTRACT

Embodiments of the invention are directed to methods for improving performance of a multi-core processor. A non-limiting method includes increasing a first operating frequency to a first elevated operating frequency of a first core of a gang of cores, the gang of cores comprising a plurality of cores of the multi-core processor. The method further includes upon a determination that an operating temperature of the first core is above a threshold temperature, switching processing of a thread from the first core to a second core in the gang of cores. The method further includes reducing the first operating frequency of the first core. The method further includes increasing the operating frequency of the second core to a second elevated operating frequency.

17 Claims, 5 Drawing Sheets

(56) References Cited

U.S. PATENT DOCUMENTS

| | | | |
|---|---|---|---|
| 2015/0046729 A1* | 2/2015 | Fukuoka | G06F 13/24 713/320 |
| 2015/0106640 A1* | 4/2015 | Brackman | G06F 1/3243 713/324 |
| 2015/0121105 A1* | 4/2015 | Ahn | G06F 1/324 713/322 |
| 2016/0054787 A1 | 2/2016 | Trautman et al. | |
| 2016/0098075 A1* | 4/2016 | Jahagirdar | G06F 11/1441 713/323 |
| 2016/0124476 A1* | 5/2016 | Mittal | G06F 1/3206 713/320 |
| 2016/0179680 A1 | 6/2016 | Shows et al. | |
| 2018/0239641 A1* | 8/2018 | Kumar | G06F 9/5027 |

OTHER PUBLICATIONS

Electronics Tutorials, "Digital Buffer Tutorial", Nov. 19, 2016, 14 pages.*

Yeo et al., "Predictive Dynamic Thermal Management for Multicore Systems", Jun. 2008, pp. 734-739.*

Coskun et al., "Proactive Temperature Balancing for Low Cost Thermal Management in MPSoCs", Nov. 2008, 8 pages.*

Khan et al., "Evolutionary Based Solutions for Green Computing", 2013, pp. 178-180.*

Choi et al.; "Thermal-aware Task Scheduling at the System Software Level"; University of Illinois Conference Paper; Jan. 2007; 7 pages.

Hanumaiah et al.; "Energy-Efficient Operation of Multicore Processors by DVFS, Task Migration, and Active Cooling"; IEEE Transactions on Computers, Issue 2, vol. 63; Feb. 2014; pp. 349-360.

Merkel et al.; "Resource-conscious Scheduling for Energy Efficiency on Multicore Processors"; Karlsruhe Institute of Technology, System Architecture Group; Apr. 13-16, 2010; 14 pages.

* cited by examiner

THREAD MIGRATION AND SHARED CACHE FENCING BASED ON PROCESSOR CORE TEMPERATURE

BACKGROUND

The present invention relates in general to the field of computing. More specifically, the present invention relates to systems and methodologies for improving the performance of one core of a processor by sacrificing other cores of the processor.

A modern central processing unit (also known as a processor) can have multiple cores, each of which is capable of operating independently of other cores of the processor. In some circumstances, software is written to take advantage of multiple cores, splitting the instructions amongst the various cores of the processor. In other circumstances, the execution speed of a single core is of primary importance. Execution speed can be increased by increasing the operating frequency of the processor. However, there are limitations to how high the operating frequency can be pushed. For example, a higher operating frequency typically leads to a higher temperature of the processor. A larger area over which to dissipate the heat would be beneficial in such a case. However, that goal conflicts with the fact that a smaller area allows shorter critical paths for high-frequency design. It would be desirable to be able to utilize higher operating frequencies for processors.

SUMMARY

Embodiments of the invention are directed to methods for improving the performance of a multi-core processor. A non-limiting method includes increasing a first operating frequency to a first elevated operating frequency of a first core of a gang of cores, the gang of cores comprising a plurality of cores of the multi-core processor. The method further includes upon a determination that an operating temperature of the first core is above a threshold temperature, switching processing of a thread from the first core to a second core in the gang of cores. The method further includes reducing the first operating frequency of the first core. The method further includes increasing the operating frequency of the second core to a second elevated operating frequency.

Embodiments of the invention are directed to a multi-core processor that performs a method to improve performance. The method includes increasing a first operating frequency to a first elevated operating frequency of a first core of a gang of cores, the gang of cores comprising a plurality of cores of the multi-core processor. The method further includes upon a determination that an operating temperature of the first core is above a threshold temperature, switching processing of a thread from the first core to a second core in the gang of cores. The method further includes reducing the first operating frequency of the first core. The method further includes increasing the operating frequency of the second core to a second elevated operating frequency.

Embodiments of the invention are directed to a computer system. The computer system includes one or more processors. Each of the one or more processors is a multi-core processor that performs a method to improved performance. The method includes increasing a first operating frequency to a first elevated operating frequency of a first core of a gang of cores, the gang of cores comprising a plurality of cores of the multi-core processor. The method further includes upon a determination that an operating temperature of the first core is above a threshold temperature, switching processing of a thread from the first core to a second core in the gang of cores. The method further includes reducing the first operating frequency of the first core. The method further includes increasing the operating frequency of the second core to a second elevated operating frequency.

Additional features and advantages are realized through techniques described herein. Other embodiments and aspects are described in detail herein. For a better understanding, refer to the description and to the drawings.

BRIEF DESCRIPTION OF THE DRAWINGS

The subject matter that is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The term "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, as described above, the operating frequency of a processor core (sometimes referred to as a "clock rate") refers to the frequency at which a processor core is operating. A processor core with an operating frequency of 5 GHz means that a clock is running at 5 billion times per second and is capable performing certain tasks in the time frame of one clock tick. While there are a variety of different methods of increasing the speed at which a processor core operates, one way of increasing the speed is to increase the operating frequency of a processor core. However, there are limitations to how fast of an operating frequency can be used for a processor core. One limitation is that, as clock operating frequencies increase, the operating temperature of a processor core also increases. This can be due to one of a variety of different factors. For example, a processor may need additional voltage to operate at a higher frequency. The additional voltage can cause the temperature of the processor core to rise. In addition, the core may generate more heat because it is processing instructions at a faster rate.

Turning now to an overview of the aspects of the invention, one or more embodiments of the invention address the above-described shortcomings of the prior art by creating a gang of multiple processor cores and spreading the work of a single thread amongst the gang of multiple processor cores. In some embodiments, this involves increasing the operating frequency of one core of the gang of cores for a short period of time. Thereafter, this further involves switching the execution of the single thread to another core of the gang of cores for a short period of time. In some embodiments, switching from one core to another core in the gang of cores based is based on a temperature of the core. Once the core reaches a certain temperature, execution of the thread moves to another core in the gang of cores.

Figure 1:
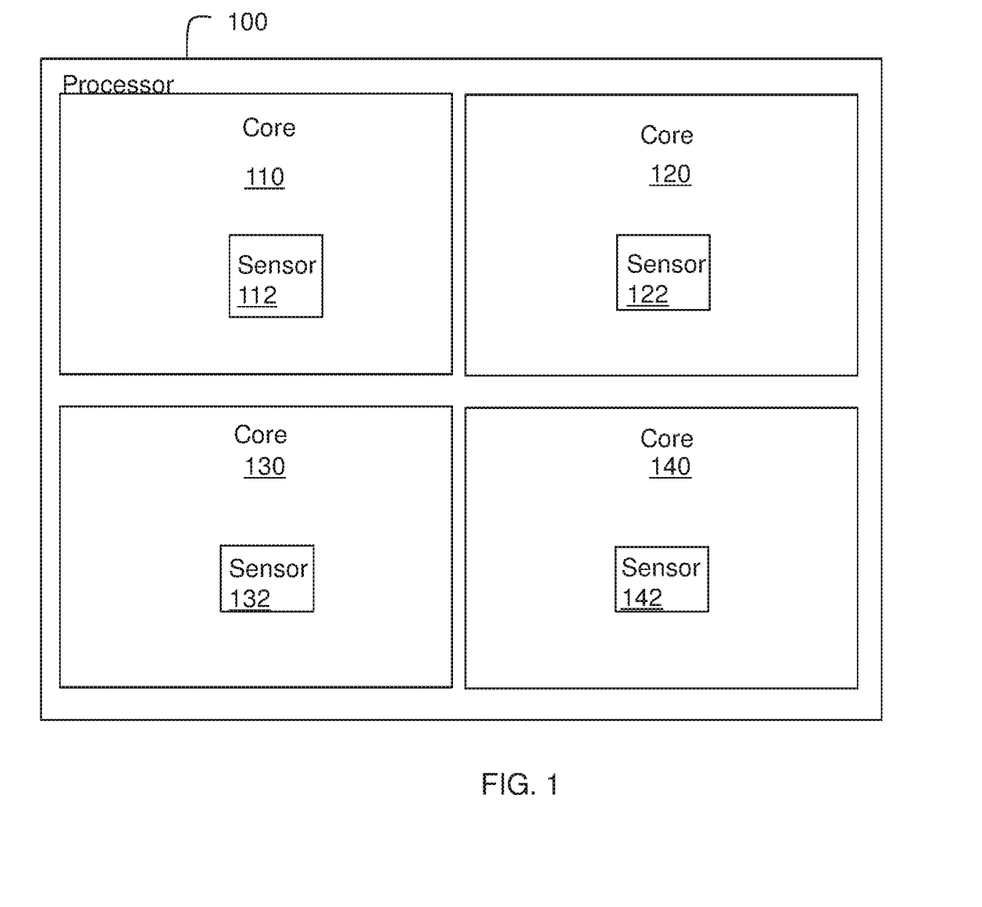
FIG. 1 is a high-level block diagram of an exemplary multi-core processor in accordance with one or more embodiments of the present invention.

With reference to FIG. 1, a block diagram of an exemplary central processing unit 100 is shown. Central processing unit 100 includes four cores (also known as processing units or processor cores). The four cores are core 110, core 120, core 130, and core 140. There can be a temperature sensor associated with each core. In this example, there would be four temperature sensors 112, 122, 132, and 142. Each of the temperature sensors would be placed in a location optimized to measure the temperature of the respective core. It should be understood that central processing unit 100 is merely exemplary. In some embodiments, a greater or lesser number of cores can be present in a central processing unit.

There are several methods of increasing the speed of central processing unit 100. One method is to utilize the different cores to each execute a different thread. With proper optimization, a computer program can perform complex operations by having each core do different tasks more efficiently than a single core could handle those operations. There are also techniques of multithreading, wherein multiple processes or threads are executed concurrently. However, for certain tasks, having a single core run as fast an operating frequency as possible might be the best way to achieve higher performance. For example, older software might not be optimized to simultaneously utilize multiple cores or multiple threads.

As stated above, a processor core has a typical operating frequency. This operating frequency can be chosen by the manufacturer to balance reliability with performance. While operating at the operating frequency, the processor core stays below the maximum operating temperature of the core. It should also be understood that if a core exceeds the maximum operating temperature, the core can be damaged and inoperable. So it can be important to ensure that a core does not exceed the maximum operating temperature. Operating a processor core at an operating frequency faster than its rating can cause the processor core to heat up beyond the maximum operating temperature. For example, an exemplary processor core might be able to run fine for days at a time at 5.0 GHz, but can exceed the maximum operating temperature when running at 5.8 GHz for just a few seconds.

In some embodiments, a set of multiple cores is grouped into a "gang" of cores. In an exemplary embodiment, four cores of processor 100 form a gang. During a first period of time, core 110 executes a thread and operates at an increased operating frequency (e.g., 5.8 GHz in the example given above). A short time later (in some embodiments, the time can be less than a second), the thread being executed on core 110 moves to core 120. The time period is short enough that core 110 never reaches its thermal limits (the maximum operating temperature). Thereafter, core 120 operates for a short period of time. After a short period of time, the thread moves to another core in the gang of cores (e.g., core 130). This process repeats for each core in the gang of cores, with each core operating at a faster operating speed for a period of time short enough such that the core remains below the maximum operating temperature. By the time operation returns to the first core in the cycle (core 110 in this example), core 110 has lowered in temperature enough to sustain another period of time at the faster operating frequency. In some embodiments, a temperature of the core is used to determine when to switch operation from one core to another core. In such embodiments, there can be a temperature sensor integrated into each core for monitoring purposes.

In order to switch operation from one core to another core, information about the state of the core can be transferred to the second core. In some embodiments, a core context move facility can be used to then move a workload from one core to another. In some embodiments, the core context move facility has capabilities similar to that of a recovery unit. Some processors have recovery features that allow a spare core to immediately take over for a failing core. A subset of such recovery features can be used as a core context move facility in one or more embodiments to ensure an orderly transition between two cores of the gang of cores. By utilizing a core context move facility, transfers from one core to another core can occur much quicker than transfers that utilize an operating system (OS) to perform task migration.

Figure 2:
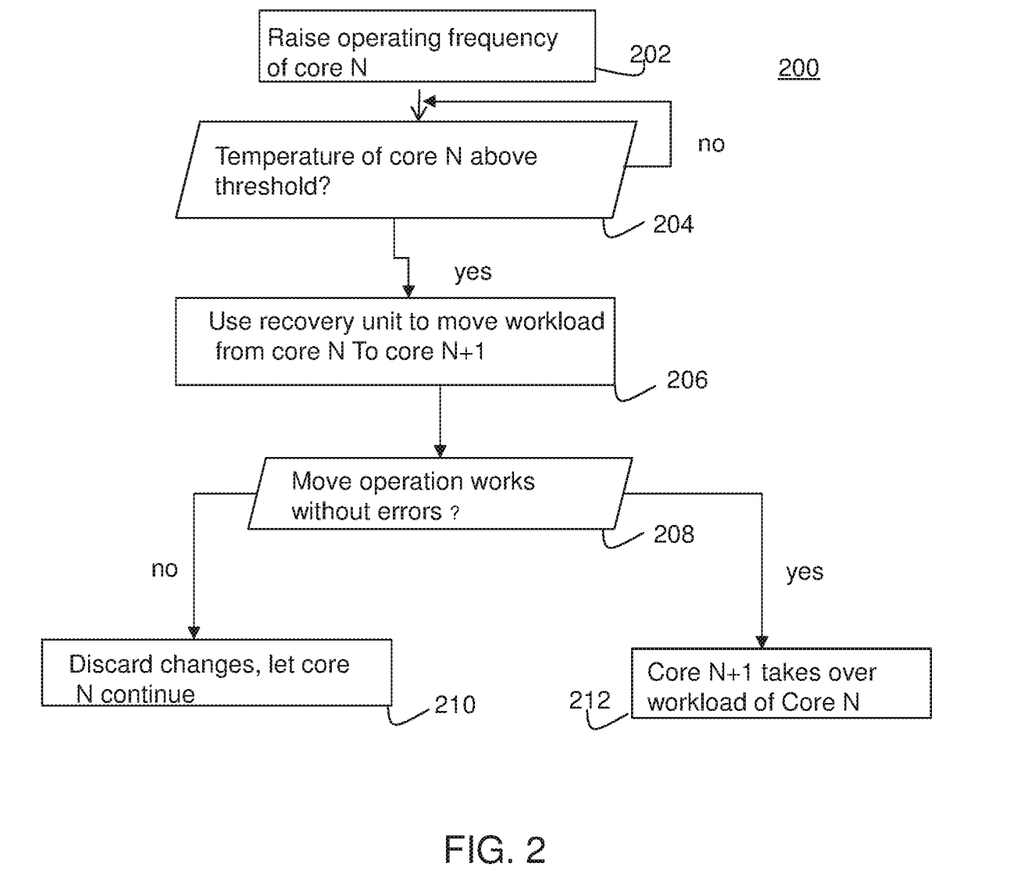
FIG. 2 is a flowchart illustrating the operation of one or more embodiments.

A flowchart illustrating method 200 is presented in FIG. 2. Method 200 is merely exemplary and is not limited to the embodiments presented herein. Method 200 can be employed in many different embodiments or examples not specifically depicted or described herein. In some embodiments, the procedures, processes, and/or activities of method 200 can be performed in the order presented. In other embodiments, one or more of the procedures, processes, and/or activities of method 200 can be combined or skipped. In one or more embodiments, method 200 is performed by a processor as it is executing instructions.

Method 200 details how a switch happens between a first core and a second core within a gang of cores. The operating frequency of the first core is raised to a first elevated operating frequency (block 202). In some embodiments, the first elevated operating frequency can be a predetermined frequency. In some embodiments, the raised frequency can be dynamically determined based on a variety of factors, such as the temperature of the first core prior to raising the operating frequency.

It should be understood that, prior to the first iteration of method 200, there can be a setup of the gang of cores. The setup can include selecting the number of cores in the gang of cores and selecting a threshold temperature. There can be situations where one wants fewer cores in the gang of cores so there are more spare cores available. There can be situations where one might want more cores in the gang of cores for potentially faster performance. A lower temperature threshold can increase the reliability of the cores in the gang of cores, while a higher temperature threshold can increase the potential speed of each core in the gang of cores (up to a certain point, until critical paths limit the speed of the core). The setup information can be performed using firmware.

The temperature of the first core is monitored to determine if it is above a threshold (block 204). The threshold can be chosen in one of a variety of different methods. For example, during testing of a processor, a maximum operating temperature of the processor can be determined. The maximum operating temperature can be the maximum temperature a processor can operate at for a specified period of time. The threshold temperature can be chosen to be below the maximum operating temperature.

If the temperature of the core is below the threshold temperature, then operation resumes at block 204, where the temperature of the first core is continuously monitored. If the temperature of the first core is at or above the threshold temperature, then a core context move facility unit is tasked to move the workload from the first core (termed core N) to a second core (termed core N+1) (block 206). In some embodiments, as opposed to using measured temperature to trigger the transfer, a predicted temperature can be used. It can be predicted when core N will exceed the maximum operating temperature based on the usage of core N and the operating frequency of core N.

In certain systems, a central processing unit has core context move functionality. In some multi-processing or multi-core systems, some cores can be set aside for use as a spare core. If one core of the multi-processing system has a failure, a core context move can be initiated. The core context move takes information about the state of the failing core, such as the contents of associated registers and the contents of associated cache lines, and transfers the information to a new core. Thereafter, the defective core can be deactivated.

In some embodiments, some of the above-described core context move features can be used in conjunction with one or more embodiments. The workload is moved from the first core to the second core. The movement of the workload is set forth in greater detail below.

It is determined if the transfer operation was successful (block 208). If so, then the core N+1 takes over for the core N (block 212). The operating frequency of core N+1 can be raised to a second elevated operating frequency. Core N can be switched to a power save mode. The first elevated operating frequency may or may not be the same as the second elevated operating frequency.

Otherwise, the changes are discarded and core N resumes the workload (block 210). This resumption of the workload can include a reduction in the operating frequency prior to returning to block 204, in an attempt to reduce the temperature of core N.

If the transfer operation is not successful, it can be determined if core N+1 should be removed from the gang of cores. In such a case, a "core fail" message can be sent to firmware to ensure that core N+1 is removed from the gang of cores.

The transfer from core N to core N+1 takes place completely in hardware. Thus, the overhead of using an OS to perform task switching is avoided. After the transfer is completed in block 212, the OS can be informed of the transfer such that future instructions are sent to the correct core.

Figure 3:
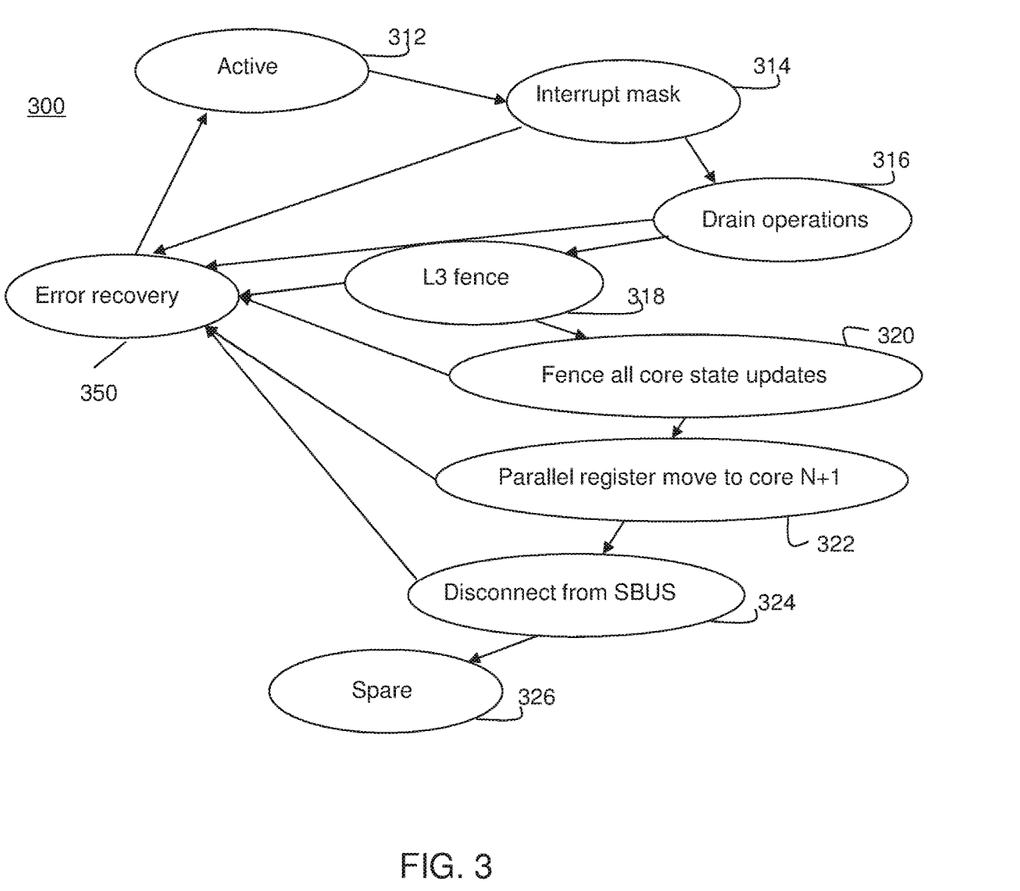
FIG. 3 is a state diagram illustrating the operation of one or more embodiments.

With reference to FIG. 3, a state diagram 300 is illustrated. In state diagram 300, it will be assumed that the operation of core N is going to be moved to core N+1. State diagram 300 represents the actions being taken in core N to prepare for a move of the operations to core N+1. It will also be assumed that the processor being discussed with respect to FIG. 3 has three levels of cache—L1 and L2 are specific to each core, while L3 is a cache shared by each core in the gang of cores. It should be understood that other configurations of the cache can be used. In some embodiments, the L2 core is shared among the gang of cores. Such a configuration would make a transition between core N and core N+1 quicker because there would be one less level of cache to transfer between cores.

It can be seen that each of the blocks in state diagram 300 is coupled to block 350—error recovery. This block represents the fact that an error recovery step can be performed to ensure that the transfer from core N to core N+1 is proceeding as intended. If the transfer is not proceeding as intended, the transfer between cores can be aborted.

At block 312, core N is active. Core N receives an interrupt mask in block 314. As described above with respect to FIG. 2, the interrupt mask is generated when it is desired to transfer the operations from core N to core N+1. This can be done because the temperature of core N has exceeded a threshold temperature.

Block 316 represents the drain of operations from core N. In other words, the pipeline of instructions is drained or no longer filled, such that core N will have no further instructions to perform.

Block 318 represents a fence around the L3 cache. The "fence" means that data going in and out of L3 cache is paused such that the L3 cache remains in a static state. In a similar manner, updates to the state of core N are fenced at block 320.

Block 322 represents the register move. The registers are moved from core N to core N+1. Moving the registers helps to ensure that core N+1 is in the same state that core N was to facilitate the transfer to core N+1.

Block 324 represents core N being disconnected from the main bus. The main bus is how communications within a computer system reaches the central processing unit. Disconnecting core N from the bus ensures that core N no longer receives instructions or data from the bus.

At block 326, core N is spared. In some embodiments, this means that core N is no longer the active core and is in spare status, ready to take over for another core via a sparing process.

Figure 4:
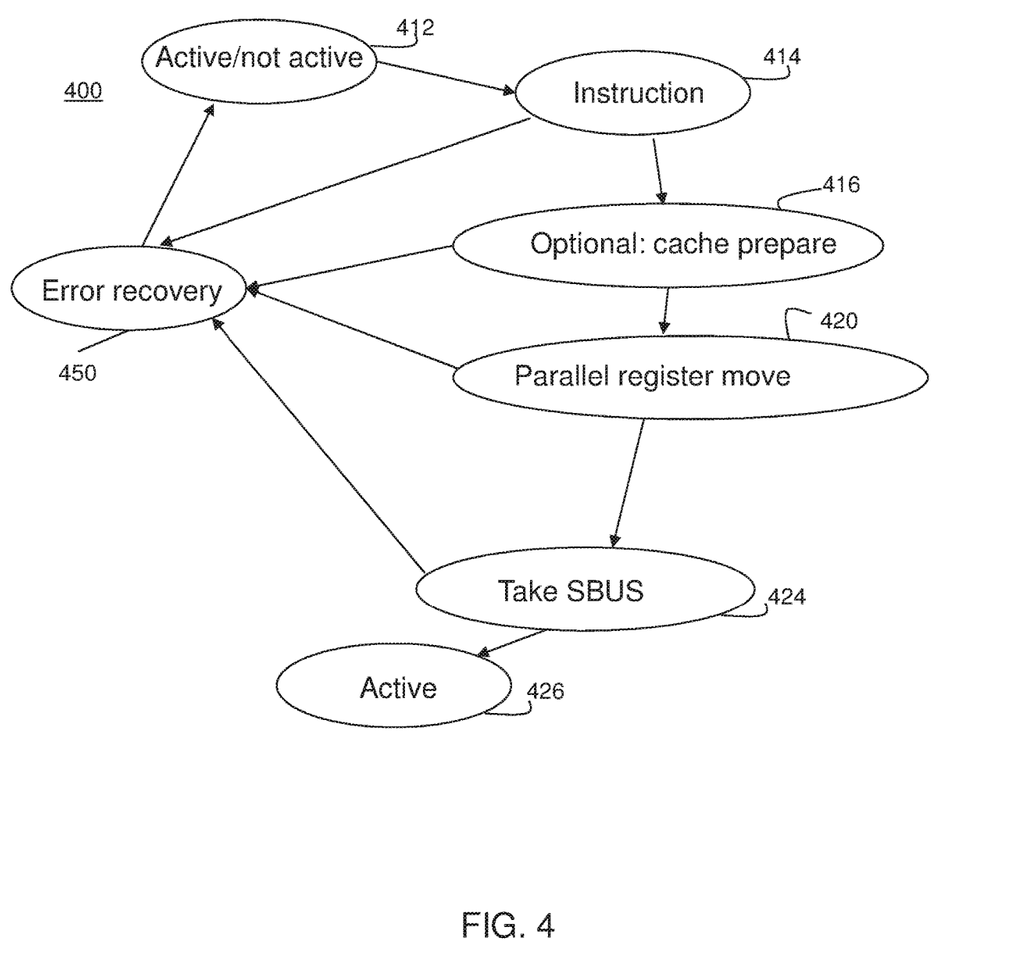
FIG. 4 is a state diagram illustrating the operation of one or more embodiments.

With reference to FIG. 4, a state diagram 400 is illustrated. In state diagram 400, it will be assumed that the operation of core N is going to be moved to core N+1. State diagram 400 represents the actions being taken in core N+1. It will also be assumed that the processor being discussed with respect to FIG. 4 has three levels of cache—L1 and L2 are specific to each core, while L3 is a cache shared by each core in the gang of cores. In some embodiments, L2 core is shared among the gang of cores. Such a configuration would make a transition between core N and core N+1 quicker because there would be one less level of cache to transfer between cores.

It can be seen in FIG. 4, that each block in state diagram 400 is coupled to block 450—error recovery. This block represents the fact that an error recovery step can be performed to ensure that the movement from core N to core N+1 is proceeding as intended.

At block 412, core N is active and core N+1 is not active. Core N+1 receives an instruction to begin a core move in block 414. As described above with respect to FIG. 2, the instruction is generated when it is desired to transfer the operations from core N to core N+1. As described above, this can be done because the temperature of core N has exceeded a threshold temperature.

Block 416 represents the preparation of the caches of core N+1. To facilitate the orderly transition from core N to core N+1, the caches (e.g., L1 and L2) of core N+1 are prepared. This can include ensuring that the caches are not full and placing information that was in the caches of core N into the caches of core N+1.

Block 420 represents the register move. The contents of the registers of core N are copied such that they are placed in the corresponding registers of core N+1. Moving the registers helps to ensure that core N+1 is in the same state that core N was to facilitate the transfer to core N+1.

Block 424 represents core N+1 being connected to the main bus. The main bus is how communications within a computer system reach the central processing unit. Connecting core N+1 to the bus ensures that core N+1 now receives instructions or data from the bus.

Thereafter, the transfer is complete and core N+1 can begin processing instructions (block 426).

Figure 5:
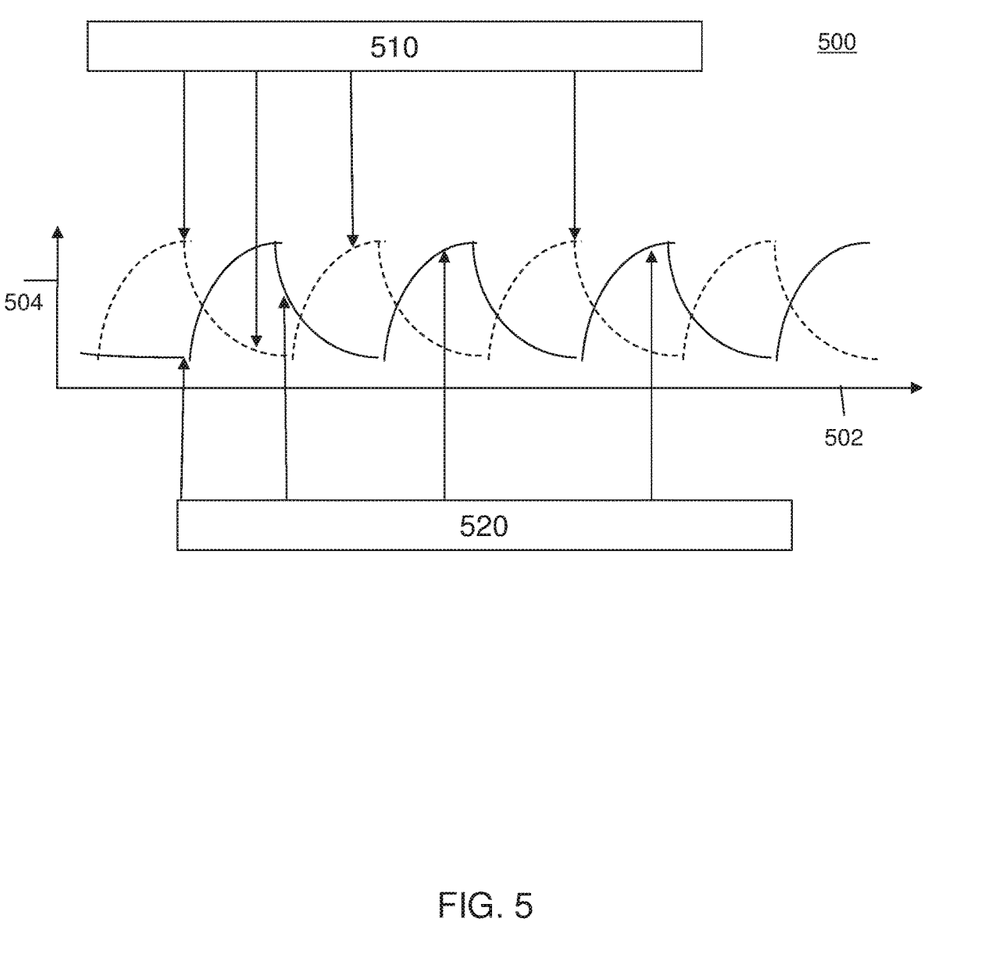
FIG. 5 depicts a graph of operating temperature of one or more embodiments.

In FIG. 5, a temperature graph 500 is shown. X-axis 502 represents the time. Y-axis 504 represents the temperature of the core. Thus, graph 500 illustrates the temperature of a core over time.

Dashed line 510 shows the temperature of a first core in a gang of cores. Solid line 520 shows the temperature of a second core in the gang of cores. At the left-end of the graph, the operating frequency of the first core is increased. As can be readily seen, the temperature of the first core increases. At the first peak of dashed line 510, the operating frequency of the first core is decreased, the operation is switched from the first core to the second core, and the operating frequency of the second core is increased. At this point, the temperature of the second core (as represented by solid line 520) rises. Because the first core is no longer being used at a high operating frequency, the temperature of the first core (as represented by dashed line 510) lowers. When the second core reaches the threshold temperature, operation switches back to the first core.

While FIG. 5 shows a situation in which there are two cores in the gang of cores, it should be understood that any number of cores can be in a gang cores. In some embodiments, each core in the gang of cores is a part of the same processor die. In such embodiments, the number of cores in the chip is the limit to the number of cores in the gang of cores.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but are not intended to be exhaustive or limited. Many modifications and variations will be apparent to those of ordinary skill in the art without departing from the scope and spirit of embodiments of the invention. The embodiments were chosen and described in order to best explain the principles of operation and the practical application, and to enable others of ordinary skill in the art to understand embodiments of the present invention for various embodiments with various modifications as are suited to the particular use contemplated.

What is claimed is:

1. A method for improving performance of a multi-core processor comprising:
    increasing a first operating frequency of a first core of a gang of cores to a first elevated operating frequency, the gang of cores comprising a plurality of cores of the multi- core processor;
    upon a determination that an operating temperature of the first core is above a threshold temperature, switching processing of a thread from the first core to a second core in the gang of cores;
    reducing the first operating frequency of the first core; and
    increasing an operating frequency of the second core to a second elevated operating frequency,
    wherein switching processing further comprises:
        ceasing filling an instruction pipeline of the first core; and
        creating a fence around a cache of the first core such that information is no longer transmitted to the cache. and
        wherein creating the fence comprises pausing data going in and out of a cache shared by the first core and the second core such that the shared cache remains in a static state.

2. The method of claim 1, wherein:
    switching processing comprises utilizing a core context move facility process of the multi-core processor.

3. The method of claim 2, wherein:
    the core context move facility process comprises gathering state information of the first core and copying the state information to the second core.

4. The method of claim 3, wherein:
    the core context move facility process further comprises copying registers from the first core to registers of the second core.

5. The method of claim 3, wherein:
    the core context move facility process further comprises copying cache memory from the first core to cache memory of the second core.

6. The method of claim 1, further comprising:
    upon a determination that a transfer operation is not successful, removing the second core from the gang of cores.

7. The method of claim 1, further comprising:
    upon a determination that a transfer operation is successful, placing the first core in a low power state.

8. The method of claim 1, wherein:
    switching processing further comprises:
        removing the first core from a main bus; and
        connecting the second core to the main bus.

9. A multi-core processor comprising:
    a gang of cores including at least two cores , wherein the multi-core processor is configured to:
        increase a first operating frequency of a first core of the gang of cores to a first elevated operating frequency;
        upon a determination that an operating temperature of the first core is above a threshold temperature, switch processing of a thread from the first core to a second core in the gang of cores;
        reduce the first operating frequency of the first core; and
        increase an operating frequency of the second core to a second elevated operating frequency,
        wherein switching processing further comprises:
            ceasing filling an instruction pipeline of the first core; and
            creating a fence around a cache of the first core such that information is no longer transmitted to the cache, and
            wherein creating the fence comprises pausing data going in and out of a cache shared by the first core and the second core such that the shared cache remains in a static state.

10. The multi-core processor of claim 9, wherein:
    to switch processing comprises utilizing a core context move facility process of the multi-core processor.

11. The multi-core processor of claim 10, wherein:
    the core context move facility process comprises gathering state information of the first core and copying the state information to the second core.

12. The multi-core processor of claim 11, wherein:
    the core context move facility process further comprises copying registers from the first core to registers of the second core.

13. The multi-core processor of claim 11, wherein:
    the core context move facility process further comprises copying cache memory from the first core to cache memory of the second core.

14. The multi-core processor of claim 9, wherein the multi-core processor is further configured to:
    upon a determination that a transfer operation is not successful, remove the second core from the gang of cores.

15. The multi-core processor of claim 9, wherein the multi-core processor is further configured to:
    upon a determination that a transfer operation is successful, place the first core in a low power state.

16. The multi-core processor of claim 9, wherein:
    to switch processing further comprises:
        removing the first core from a main bus; and
        connecting the second core to the main bus.

17. A computer system comprising:
    one or more processors, wherein each of the one or more processors is a multi-core processor comprising:
        a gang of cores including at least two cores, wherein the multi-core processor is configured to:
            increase a first operating frequency of a first core of the gang of cores to a first elevated operating frequency;
            upon a determination that an operating temperature of the first core is above a threshold temperature, switch processing of a thread from the first core to a second core in the gang of cores;
            reduce the first operating frequency of the first core; and
            increase an operating frequency of the second core to a second elevated operating frequency
        wherein switching processing further comprises:
            ceasing filling an instruction pipeline of the first core; and
            creating a fence around a cache of the first core such that information is no longer transmitted to the cache, and
            wherein creating the fence comprises pausing data going in and out of a cache shared by the first core and the second core such that the shared cache remains in a static state.

* * * * *